United States Patent
Simenson et al.

(10) Patent No.: US 8,735,740 B2
(45) Date of Patent: May 27, 2014

(54) METHOD AND APPARATUS FOR OPTICALLY TRANSPARENT VIA FILLING

(75) Inventors: Glenn Francis Simenson, Portland, OR (US); William Antoni, Tigard, OR (US); Steve Cohen, Hillsboro, OR (US); Jeffrey Howerton, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 13/038,648

(22) Filed: Mar. 2, 2011

(65) Prior Publication Data

US 2011/0147067 A1 Jun. 23, 2011

Related U.S. Application Data

(62) Division of application No. 12/194,886, filed on Aug. 20, 2008, now Pat. No. 7,943,862.

(51) Int. Cl.
*H05K 1/11* (2006.01)

(52) U.S. Cl.
USPC ............ 174/262; 257/72; 257/432; 257/778; 385/14; 385/50; 385/88; 385/129; 438/31; 438/151; 362/375; 29/846

(58) Field of Classification Search
USPC ......... 174/262; 257/72, 432, 778; 385/14, 50, 385/88, 129; 438/31, 151; 362/375; 29/846
See application file for complete search history.

(56) References Cited

U.S. PATENT DOCUMENTS

| | | | |
|---|---|---|---|
| 4,155,972 A | | 5/1979 | Hauser et al. |
| 4,161,280 A | * | 7/1979 | Kasinskas ..................... 239/1 |
| 4,305,770 A | * | 12/1981 | Stiles ........................ 156/180 |
| 5,129,458 A | * | 7/1992 | King et al. ..................... 166/295 |
| 5,133,120 A | * | 7/1992 | Kawakami et al. ............. 29/852 |
| 5,243,142 A | * | 9/1993 | Ishikawa et al. .............. 174/262 |
| 5,293,025 A | | 3/1994 | Wang |
| 5,314,545 A | * | 5/1994 | Folts et al. ................. 134/22.11 |
| 5,348,693 A | * | 9/1994 | Taylor et al. .................. 264/401 |
| 5,376,859 A | * | 12/1994 | Kim et al. ..................... 310/334 |
| 5,518,964 A | | 5/1996 | DiStefano et al. |
| 5,593,606 A | | 1/1997 | Owen et al. |
| 5,614,114 A | | 3/1997 | Owen |
| 5,699,613 A | | 12/1997 | Chong et al. |
| 5,747,095 A | | 5/1998 | McAllister et al. |

(Continued)

FOREIGN PATENT DOCUMENTS

| | | |
|---|---|---|
| JP | 07-201260 | 8/1995 |
| WO | 2007/142909 A2 | 12/2007 |

OTHER PUBLICATIONS

U.S. Appl. No. 11/742,862 Office Action dated Jun. 13, 2008.
U.S. Appl. No. 11/742,862 Office Action dated Mar. 9, 2009.

(Continued)

*Primary Examiner* — Xiaoliang Chen

(57) ABSTRACT

A method and apparatus for filling a via with transparent material is presented, including the steps of providing a panel having a via, occluding the via with transparent material in a workable state so that a portion of the occluding material is internal to the via and a portion of the material is external to said via. The external and internal portions are separated so the transparent filler material, when set, forms a smooth and featureless surface. This causes the filled via to have a substantially even and uniform appearance over a wide range of viewing angles when lit.

22 Claims, 5 Drawing Sheets

(56) References Cited

U.S. PATENT DOCUMENTS

| | | | |
|---|---|---|---|
| 5,757,079 A | 5/1998 | McAllister et al. | |
| 5,787,578 A | 8/1998 | Farooq et al. | |
| 5,801,441 A | 9/1998 | DiStefano et al. | |
| 5,817,347 A * | 10/1998 | Tamcsin et al. | 425/192 R |
| 5,843,567 A * | 12/1998 | Swift et al. | 428/221 |
| 5,909,266 A * | 6/1999 | Matsuo et al. | 349/187 |
| 5,951,349 A | 9/1999 | Larose et al. | |
| 6,021,564 A | 2/2000 | Hanson | |
| 6,104,087 A | 8/2000 | DiStefano et al. | |
| 6,194,291 B1 | 2/2001 | DiStefano et al. | |
| 6,211,485 B1 | 4/2001 | Burgess | |
| 6,235,544 B1 | 5/2001 | Franklin et al. | |
| 6,339,461 B1 * | 1/2002 | Kashiwazaki et al. | 349/155 |
| 6,383,322 B1 * | 5/2002 | Wang | 156/79 |
| 6,396,082 B1 * | 5/2002 | Fukasawa et al. | 257/79 |
| 6,416,844 B1 | 7/2002 | Robson | |
| 6,427,324 B1 | 8/2002 | Franklin et al. | |
| 6,497,991 B1 * | 12/2002 | Ishiguro | 430/311 |
| 6,541,709 B1 | 4/2003 | Franklin et al. | |
| 6,541,712 B1 | 4/2003 | Gately et al. | |
| 6,576,869 B1 | 6/2003 | Gower et al. | |
| 6,599,768 B1 * | 7/2003 | Chen | 438/22 |
| 6,605,495 B1 * | 8/2003 | Kuo | 438/151 |
| 6,610,960 B2 | 8/2003 | De Steur et al. | |
| 6,627,844 B2 | 9/2003 | Liu et al. | |
| 6,631,558 B2 | 10/2003 | Burgess | |
| 6,635,553 B1 | 10/2003 | DiStefano et al. | |
| 6,834,761 B1 * | 12/2004 | Kesling | 206/63.5 |
| 6,835,960 B2 * | 12/2004 | Lin et al. | 257/81 |
| 6,838,314 B2 | 1/2005 | Chang | |
| 6,881,662 B2 | 4/2005 | Kung et al. | |
| 6,885,788 B2 * | 4/2005 | Iwaki et al. | 385/15 |
| 7,045,221 B2 * | 5/2006 | Carey et al. | 428/647 |
| 7,060,595 B2 | 6/2006 | Ou et al. | |
| 7,096,579 B2 * | 8/2006 | Murata | 29/832 |
| 7,217,375 B2 * | 5/2007 | Lai | 264/1.1 |
| 7,218,798 B2 * | 5/2007 | Aoki et al. | 385/4 |
| 7,230,278 B2 * | 6/2007 | Yamada et al. | 257/80 |
| 7,338,615 B2 * | 3/2008 | Shepherd et al. | 252/62.3 R |
| 7,495,819 B2 * | 2/2009 | Sakurai et al. | 359/296 |
| 7,578,958 B2 * | 8/2009 | Patel et al. | 264/460 |
| 7,632,434 B2 * | 12/2009 | Duescher | 264/12 |
| 7,943,862 B2 * | 5/2011 | Simenson et al. | 174/262 |
| 7,960,684 B2 | 6/2011 | Payne | |
| 2001/0045611 A1 | 11/2001 | Clatanoff et al. | |
| 2002/0113312 A1 | 8/2002 | Clatanoff et al. | |
| 2002/0173062 A1 * | 11/2002 | Chen et al. | 438/30 |
| 2002/0196997 A1 * | 12/2002 | Chakravorty et al. | 385/14 |
| 2003/0066679 A1 | 4/2003 | Castro et al. | |
| 2003/0127732 A1 * | 7/2003 | Nakazawa et al. | 257/734 |
| 2003/0127733 A1 * | 7/2003 | Nakazawa et al. | 257/734 |
| 2003/0137621 A1 * | 7/2003 | Zhang et al. | 349/106 |
| 2003/0153176 A1 * | 8/2003 | Karakawa | 438/637 |
| 2003/0174967 A1 * | 9/2003 | Murali | 385/50 |
| 2003/0183418 A1 | 10/2003 | Castro et al. | |
| 2003/0183905 A1 * | 10/2003 | Karakawa | 257/637 |
| 2003/0190799 A1 | 10/2003 | Kung et al. | |
| 2003/0196987 A1 | 10/2003 | Kung et al. | |
| 2004/0001661 A1 * | 1/2004 | Iwaki et al. | 385/14 |
| 2004/0067029 A1 * | 4/2004 | Wickman | 385/88 |
| 2004/0112881 A1 | 6/2004 | Bloemeke | |
| 2004/0126075 A1 * | 7/2004 | Murali | 385/129 |
| 2004/0126547 A1 * | 7/2004 | Coomer | 428/209 |
| 2004/0140560 A1 | 7/2004 | Harvey et al. | |
| 2004/0159630 A1 * | 8/2004 | Chang | 216/24 |
| 2004/0173810 A1 * | 9/2004 | Lin et al. | 257/100 |
| 2005/0012108 A1 * | 1/2005 | Lin et al. | 257/99 |
| 2005/0014362 A1 * | 1/2005 | Ho et al. | 438/637 |
| 2005/0048408 A1 * | 3/2005 | Japp et al. | 430/311 |
| 2005/0054130 A1 * | 3/2005 | Leon et al. | 438/31 |
| 2005/0077083 A1 | 4/2005 | Mattix | |
| 2005/0087747 A1 * | 4/2005 | Yamada et al. | 257/80 |
| 2005/0100264 A1 * | 5/2005 | Kim et al. | 385/14 |
| 2005/0150402 A1 * | 7/2005 | Kambara | 101/123 |
| 2005/0176272 A1 | 8/2005 | Rosenau | |
| 2005/0189656 A1 | 9/2005 | Tan | |
| 2006/0001153 A1 * | 1/2006 | Sakamoto | 257/712 |
| 2006/0088240 A1 * | 4/2006 | Aoki et al. | 385/9 |
| 2006/0091023 A1 | 5/2006 | Bukhari et al. | |
| 2006/0109015 A1 * | 5/2006 | Thacker et al. | 324/754 |
| 2006/0124946 A1 * | 6/2006 | Fujita | 257/98 |
| 2006/0157859 A1 * | 7/2006 | Chou | 257/762 |
| 2006/0194331 A1 * | 8/2006 | Pamula et al. | 436/150 |
| 2006/0261342 A1 * | 11/2006 | Wells | 257/72 |
| 2006/0268210 A1 * | 11/2006 | Denda | 349/139 |
| 2006/0275539 A1 * | 12/2006 | Hirai et al. | 427/58 |
| 2007/0085215 A1 * | 4/2007 | Budd et al. | 257/778 |
| 2007/0086718 A1 * | 4/2007 | Aoki et al. | 385/132 |
| 2007/0205479 A1 * | 9/2007 | Dangel et al. | 257/432 |
| 2007/0217956 A1 * | 9/2007 | Pamula et al. | 422/100 |
| 2007/0221931 A1 * | 9/2007 | Yamada et al. | 257/80 |
| 2007/0278703 A1 | 12/2007 | Hardy et al. | |
| 2007/0291496 A1 * | 12/2007 | Nashner et al. | 362/375 |
| 2008/0123198 A1 * | 5/2008 | Fujita | 359/709 |
| 2008/0206929 A1 * | 8/2008 | Kambara | 438/126 |
| 2009/0000498 A1 * | 1/2009 | Kambura | 101/123 |
| 2009/0014909 A1 * | 1/2009 | Kambara | 264/272.11 |
| 2009/0218734 A1 * | 9/2009 | Eberth et al. | 264/571 |
| 2010/0322551 A1 * | 12/2010 | Budd et al. | 385/14 |
| 2011/0151046 A1 | 6/2011 | Simenson et al. | |

OTHER PUBLICATIONS

U.S. Appl. No. 12/194,886 Notice of allowance, Sep. 3, 2010, 5 Pages.

U.S. Appl. No. 12/194,886 Office Action Jun. 10, 2010, 11 pages.

U.S. Appl. No. 12/194,886 Response to Office Action Aug. 24, 2010, 8 pages.

Dec. 17, 2013 Office Action concerning corresponding Japanese Application No. 2011-523992 (This Office Action was translated and sent to applicant on Jan. 16, 2014).

Jan. 14, 2014 Office Action concerning corresponding Chinese Application No. 200980138265.2 (This Office Action was translated and sent to applicant on Feb. 6, 2014).

* cited by examiner

METHOD AND APPARATUS FOR OPTICALLY TRANSPARENT VIA FILLING

This application is a divisional of application Ser. No. 12/194,886, filed Aug. 20, 2008, now U.S. Pat. No. 7,943,862, issued May 17, 2011.

FIELD OF THE DISCLOSURE

The field of the technical subject matter relates to methods for filling a via with material and products produced through use of such methods. More particularly it relates to filling very small vias with optically transparent material. Even more particularly it relates to filling very small vias with optically transparent material so that the vias are largely unnoticeable when unlit and provide an even, uniform light when backlit.

BACKGROUND

Projecting a light through a housing to provide information is commonplace. Examples include but are not limited to computer keyboards that include indication lights for functions such as "Caps Lock" or "Num Lock"; computer monitors that include an "on/off" light, automobiles that include lights to indicate whether heated seats are on or off, or whether an air bag is on or off; televisions with indicator lights, and a whole host of other consumer electronics. A common way to provide for such lighting is to provide a projecting light that is visible when the light is off and brightly lit to indicate when the light is on. A collection of lights, or holes for lights, may be disruptive to the objectives of an industrial designer.

One method of attempting to make the holes for lights less visible is to drill very small, tapered holes and fill them with a transparent material. Holes or vias can be formed using mechanical drills, lasers, electrical discharge machining, or chemical etching. A method for producing optical vias is described in co-pending application Ser. No. 11/742,862 PROCESS FOR OPTICALLY TRANSPARENT VIA FILLING, assigned to the assignee of the instant invention. In this method, the vias are drilled, filled with workable transparent material, the filler transparent material set, and then the surface is cleaned to remove excess set transparent material from the visible surface of the article. By workable we mean that the material is in a plastic state, able to be poured or otherwise inserted into the via and conform to the interior shape of the via, thereby sealing it. This process is illustrated in FIGS. 1a-1d. In FIG. 1a, a substrate 10, having a front or cosmetic side 12 and a back side 14, the substrate 10 having a via 16 filled with a transparent filler 18 being irradiated with ultraviolet (UV) radiation 20 from an ultraviolet light source 22 to set the filler 18. FIG. 1b shows the same substrate 10 and via 16 now filled with set filler 24. Note that the UV radiation has penetrated and set filler that extends beyond front side 12 causing a "finger" 26 of cured filler to extend beyond front side 12. In FIG. 1c, a mechanical device such as a blade is used to remove the finger 26 of set material from front side 12 of the substrate 10. The finger 26 of set material can also sometimes be removed by simply wiping with a cloth if the fingers are small enough. FIG. 1d shows the substrate 10 with via 16 filled with set material 24 following removal of finger 26.

FIG. 2 shows a high resolution optical microscope image of a via 30 filled with cured filler 32 taken from the front or cosmetic side 34 of the substrate following removal of excess cured filler. As can be seen in FIG. 2, this process leaves a fractured surface in the cured transparent material 32 on the visible side of the article which can make the via unsightly, more visible when unlit and impairs the lit appearance, all of which are undesirable. Accordingly, there remains a need for a method and apparatus for filling vias with a transparent material without surface fractures to improve their aesthetics both when lit and unlit.

SUMMARY OF THE INVENTION

Disclosed are improved methods for occluding a via in a relatively thin substrate or panel with a material that permits the transmission of light through the transparent filler material and products that are made by such methods. By via we refer to a hole formed in a panel or substrate extending from one surface to another characterized by an interior volume bounded by the interior walls of the via and planes which extend the surfaces penetrated by the via. By occlude we mean to introduce material into the interior volume of the via in such a fashion as to completely fill a cross-section of the via. Note that the entire via volume of the via may or may not be completely filled, however, excess material that extends beyond the volume of the via at one surface is typically present. It is one of the goals of the instant invention to disclose methods and apparatuses for removing this excess material in such a fashion as to leave the surface smooth and debris-free and thereby provide an improved filled, light-transmissive via. Panels or substrates to be filled in this manner are typically made of metal, although other materials such as plastic or composite materials may be used. Transparent filler material is introduced into the via in workable form and then made or allowed to set or cure into a hard, optically transparent material that typically adheres to the inside walls of the via to assist in remaining in place in the via. Exemplary materials that may be used include UV-settable polymers, or other polymers that set by exposure to radiation, epoxies or other multi-part compounds that set through chemical reactions, compounds that set through cooling or application of heat and compounds that set by evaporation of solvents or otherwise harden. Any of these materials may be used advantageously in the instant invention.

An exemplary light transmissive material is AHS-1100 Developmental Material manufactured by 3M Company, St. Paul, Minn. Other transparent fillers may be used advantageously, including fillers that can be set by means other than UV radiation. Set refers to the process whereby transparent filler transforms from a substantially liquid or workable state to a solid or relatively hardened state. Transparent fillers can be set by chemical reactions, heat or other electromagnetic radiation, exposure to air, evaporation of solvents or other means. The embodiments described herein can be adapted to use these other setting methods. For example, in the case where the filler is a two-part epoxy that is mixed prior to application to the via and will set in a determined amount of time, the residue can be quickly removed by mechanical or compressed air before the filler sets completely. It is also contemplated that, in the alternative to the materials described above, thermoplastic materials can form the transparent fillers. In this case the excess material would have to be removed prior to the setting by cooling of the thermoplastic materials.

According to one embodiment of the instant invention, the method comprises providing a panel including at least one via and occluding the via with an optically transmissive material, then removing the excess material prior to it becoming set through curing, cooling, evaporation of solvent or otherwise hardened. Removing the excess material prior to setting leaves the exposed surface of the transparent material smooth and unfeatured, thereby making it less visible when unlit and provides more even, uniform illumination when lit. The excess material can be removed by wiping the surface by mechanical means, such as a blade or a squeegee or the excess material can be removed with compressed air. These steps can be followed by wiping with a solvent or vacuum suction or combinations of these methods to remove any remaining excess material. Additionally, light-transmissive vias made according to methods described herein are also disclosed. For example, taught herein is a via having a light transmissive properties wherein the light transmissive via in an article is filled with an optically transmissive material, where the excess optically transmissive material is at least partially removed from the surface of the article prior to the material setting.

BRIEF DESCRIPTION OF THE DRAWINGS

The description herein makes reference to the accompanying drawings wherein like reference numerals refer to like parts throughout the several views, and wherein.

DETAILED DESCRIPTION OF PREFERRED EMBODIMENTS

Figure 3A:
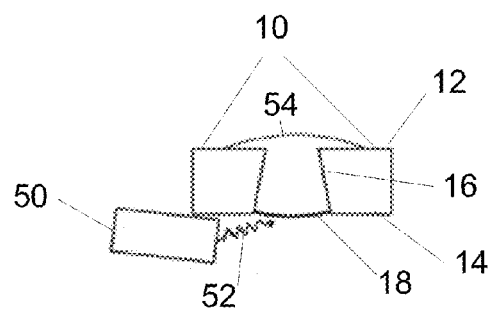
FIGS. 3a, 3b, 3c and 3d show a method of setting and removing excess material from a filled via using mechanical means.
Figure 3B:
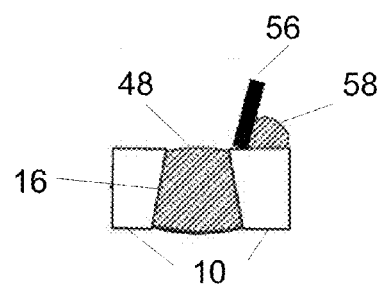
Figure 3C:
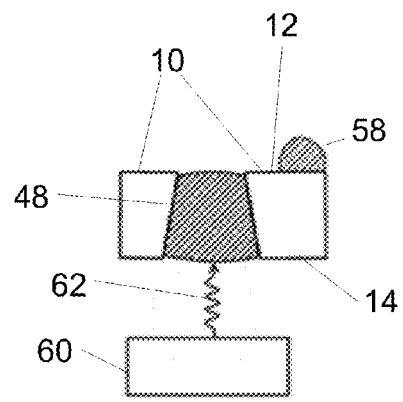
Figure 3D:
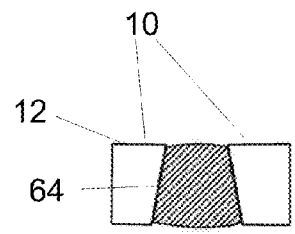

An object of the instant invention is to provide methods and apparatuses for creating improved filled holes in surfaces. FIG. 3a shows a schematic diagram of a substrate 10 with a front or cosmetic side or surface 12 and a back side or surface 14 having a via 16 occluded with a transparent filler 18. The transparent filler 18 is partially set using a UV light source 50 emitting UV light 52. Note that the UV light is being directed to the substrate at an angle close to parallel with the back side 14 of the substrate to prevent radiation from penetrating through the via 16 and setting the portion of filler 54 that extends beyond the front surface 12. FIG. 3b shows the substrate 10 and partially set filler 48 in the via 16. Since the portion of the partially set filler 48 that extends beyond the front surface 12 is not set, it can be removed using a mechanical blade or squeegee 56 wiped across the surface, removing excess filler 58 from the immediate vicinity of the via 16. FIG. 3c shows the substrate 10 with the partially set filler 48 and the excess unset filler 58 on the top surface 12 of the substrate 10. In this embodiment, UV light source 60 is placed more perpendicular to the back surface 14 so that the UV light rays 62 penetrate the partially set filler 48 all the way to the top surface 12 and thereby complete the setting process. In other embodiments the excess filler material can be removed prior to any setting taking place. FIG. 3d shows the substrate 10 with the completely set filler 64 after being cleaned to remove the unset filler remaining on the top surface 12. This cleaning can be accomplished by either vacuum or solvent wash or other equivalent methods and can be performed either before or after the material in the via has been finally set.

Figure 4A:
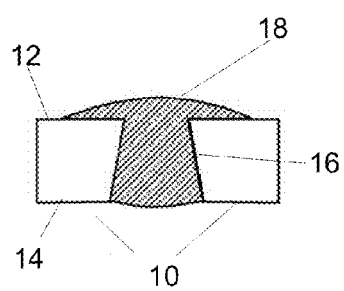
FIGS. 4a, 4b, and 4c show a method of setting and removing excess material from a filled via using an air knife and vacuum.
Figure 4B:
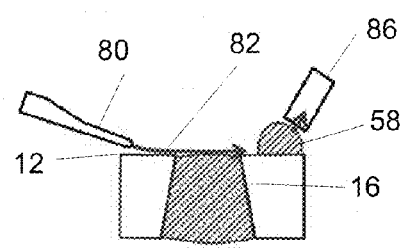
Figure 4C:
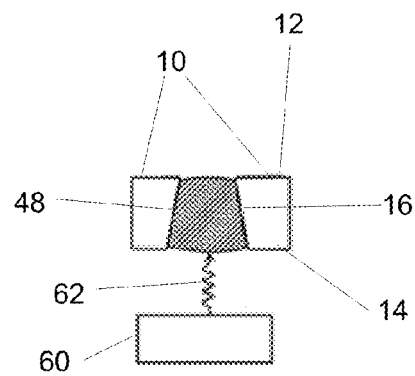

Another embodiment of the instant invention is illustrated in FIGS. 4a-4c. FIG. 4a shows a substrate 10 with a front side 12 and a back side 14 with a via 16. Via 16 is occluded with workable transparent filler 18. In FIG. 4b, an air knife 80 is used to direct a compressed air stream 82 onto the top surface of the substrate 12 to remove excess filler 58 from the immediate vicinity of the via 16. In this embodiment of the invention, a vacuum nozzle, 86 removes the excess filler 58 from the top surface 12 once it has been moved away from the via. FIG. 4c shows the partially set filler 48 in the via 16 being set using UV radiation 62 from a UV source 60 from the back surface 14 of the substrate 10. It is also contemplated that the setting could be by heating, cooling, evaporation of solvents, chemical reaction or other means. Following setting, the front surface 10 may be wiped with solvent to remove any remaining traces of excess filler.

Figure 5:
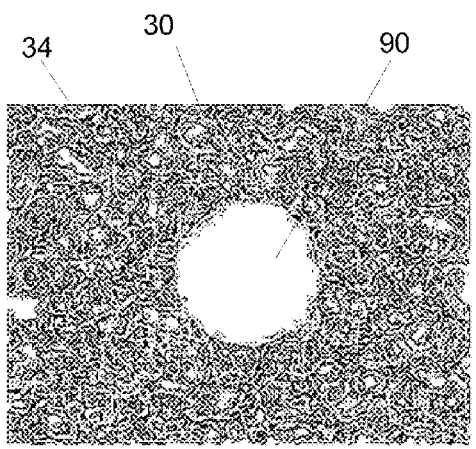
FIG. 5 is an optical microscopic image of a filled via processed according to an embodiment of the instant invention.

FIG. 5 shows an optical microscope picture of a filled via 30 produced by the instant invention taken from the cosmetic or front side 34. Note the smooth appearance of the filler 90, which makes the filled via less noticeable when unlit and makes the via appear more evenly illuminated from a wider range of viewing angles.

Figure 1A:
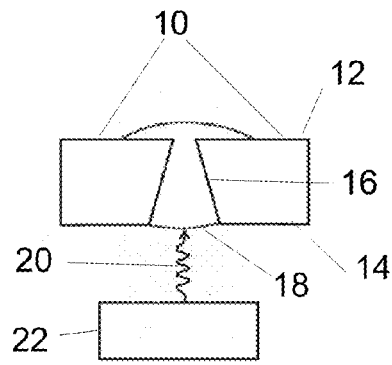
FIGS. 1a, 1b, 1c, and 1d show a prior art method of setting and removing excess material from a filled via.
Figure 1B:
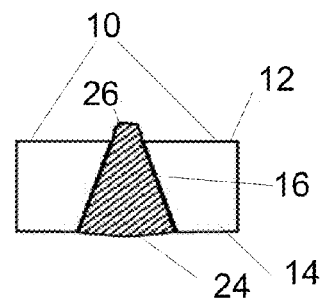
Figure 1C:
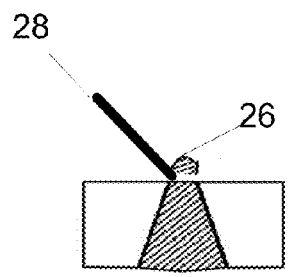
Figure 1D:
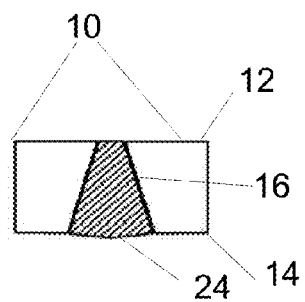
Figure 2:
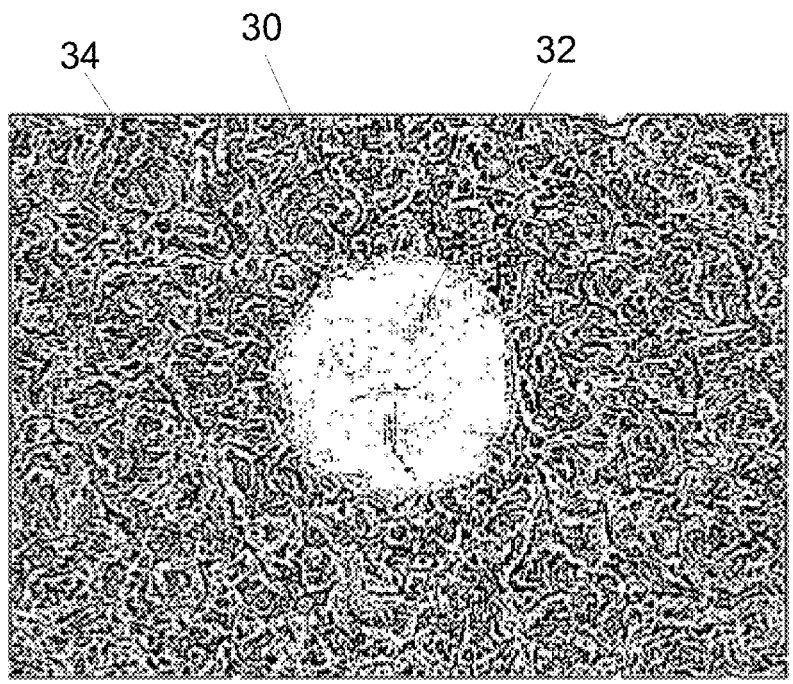
FIG. 2 is an optical microscopic image of a filled via having been set and cleaned with prior art methods.
Figure 6:
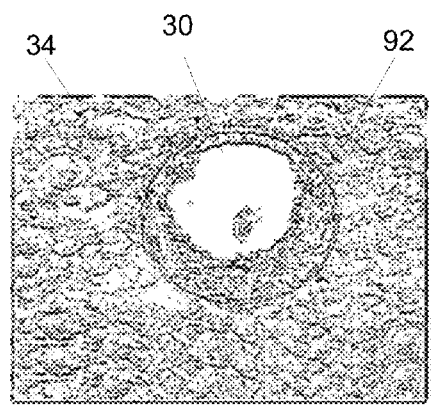
FIG. 6 is a scanning electron microscope image of a filled via processed according to an embodiment of the instant invention.
Figure 7:
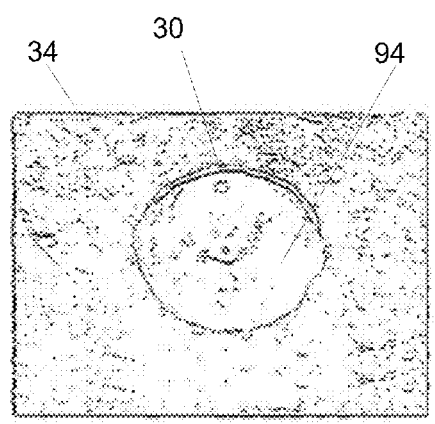
FIG. 7 is a scanning electron microscope image of a filled via processed according to an embodiment of the instant invention.

FIG. 6 shows a scanning electron microscope image of a via 30 taken from the front side 34 of a panel, filled with transparent material 92 that has been prepared according to an embodiment of the instant invention using a mechanical means to remove the excess unset filler. While the appearance of the filled via is greatly improved over the prior art, for example as shown in FIG. 2, a small amount of debris and surface texture is apparent on the set filler. FIG. 7 shows a scanning electron microscope image of a via 30 with a transparent filler 94 taken from the front side 34 of a panel, processed according to an embodiment of the instant invention that uses compressed air and vacuum to remove excess filler from the via. This picture shows that the filler 94 has no detectable residue and no apparent surface texture.

It will also be appreciated that details of the preferred embodiments can be interchanged and still be within the bounds of the teachings of this invention.

What is claimed:

1. A light-transmissive plug, disposed in a via extending through a panel, formed of a transparent material, said light-transmissive plug made by a process comprising:
    filling said via with said transparent material in a workable state such that a first portion of said transparent material is within the via and a second portion of said transparent material extends from said first portion to a location outside said via;
    irradiating said transparent material at an angle less than perpendicular to said panel and thereby partially setting said portion of said transparent material such that said second portion of said transparent material is substantially in said workable state, wherein said angle is close to parallel to said panel; and
    after partially setting said first portion transparent material, separating said second portion of said transparent material in said workable state from said first portion of said transparent material.

2. The light-transmissive plug of claim 1, wherein said separating is done with a fluid directed through a nozzle.

3. The light-transmissive plug of claim 1, wherein said separating is done with a mechanical blade.

4. The light-transmissive plug of claim 1, wherein said second portion of said transparent material is removed by vacuum from said panel following said separation.

5. The light transmissive plug of claim 1, wherein said first portion of said transparent material is substantially set by irradiating said transparent material.

6. The light-transmissive plug of claim 1, wherein said second portion of said transparent material is separated from said first portion of said transparent material by a compressed air stream directed through a nozzle onto said first side of said panel.

7. The light-transmissive plug of claim 1, wherein said second portion of said transparent material is separated from the said first portion by fluid directed through a nozzle, and wherein said second portion of said transparent material is removed by vacuum from said panel following said separation.

8. The light-transmissive plug of claim 1, wherein said transparent material is UV-light settable and said setting device directs UV-light.

9. The light-transmissive plug of claim 1, wherein a scanning electron microscope image of said via shows no detectable reside on said second side of said panel after said second portion of said transparent material is removed.

10. A light-transmissive plug, disposed in a via extending through a panel, formed of a light-settable transparent material, said light-transmissive plug made by a process comprising:
   filling said via with said light-settable transparent material in a workable state such that a first portion of said light-settable transparent material is within the via and a second portion of said light-settable transparent material extends from said first portion to a location outside said via;
   irradiating said light-settable transparent material with light directed at an angle to said panel to prevent said light from penetrating through said via and to at least partially set said first portion of said light-settable, transparent material responsive to said light and to substantially retain said second portion of said light-settable transparent material in said workable state; and
   after partially setting said first portion of said light-settable transparent material, separating said second portion of said light-settable transparent material in said workable state from said first portion of said light-settable transparent material.

11. The light-transmissive plug of claim 10, wherein said separating is done with a fluid directed through a nozzle.

12. The light-transmissive plug of claim 10, wherein said separating is done with a mechanical blade.

13. The light-transmissive plug of claim 10 wherein said transparent material surface is further made by at least substantially setting said first portion of said transparent material after separating said second portion of said transparent material from said first portion of said transparent material.

14. The light-transmissive plug of claim 10, wherein said second portion of said light-settable transparent material is removed by vacuum from said panel following said separation.

15. The light-transmissive plug of claim 10, wherein said first portion of said light-settable transparent material is substantially set by irradiating said transparent material.

16. The light-transmissive plug of claim 10, wherein said second portion of said light-settable transparent material is separated from said first portion of said light-settable transparent material by a compressed air stream directed through a nozzle onto said first side of said panel.

17. The light-transmissive plug of claim 10, wherein said second portion of said light-settable transparent material is separated from the said first portion by fluid directed through a nozzle, and wherein said second portion of said light-settable transparent material is removed by vacuum from said panel following said separation.

18. The light-transmissive plug of claim 10, wherein said light-settable transparent material is UV-light settable and said setting device directs UV-light.

19. The light-transmissive plug of claim 10, wherein a scanning electron microscope image of said via shows no detectable reside on said second side of said panel after said second portion of said light-settable transparent material is removed.

20. The light-transmissive plug of claim 10, wherein said light is prevented from penetrating the via beyond said second side.

21. The light-transmissive plug of claim 10, wherein said light is prevented from penetrating said light-settable transparent material beyond said second side.

22. The light-transmissive plug of claim 10, wherein said light is prevented from fully curing said light-settable transparent material beyond said second side.

* * * * *